United States Patent
Singh et al.

(10) Patent No.: US 7,720,920 B2
(45) Date of Patent: May 18, 2010

(54) CLIENT SIDE BASED DATA SYNCHRONIZATION AND STORAGE

(75) Inventors: Harsh Vardhan Singh, Hyderabad (IN); Jagdeesh Shukla, Pune (IN); Anup Sivadas, Hyderabad (IN); Satish K. Chittamuru, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/769,616

(22) Filed: Jun. 27, 2007

(65) Prior Publication Data

US 2009/0006529 A1    Jan. 1, 2009

(51) Int. Cl.
G06F 15/16 (2006.01)
G06F 12/00 (2006.01)
G06F 17/30 (2006.01)

(52) U.S. Cl. .................. 709/206; 707/201; 707/203
(58) Field of Classification Search .............. None
See application file for complete search history.

(56) References Cited

U.S. PATENT DOCUMENTS

| | | | | |
|---|---|---|---|---|
| 5,903,723 | A * | 5/1999 | Beck et al. .................. 709/245 |
| 5,961,590 | A | 10/1999 | Mendez et al. |
| 6,134,582 | A | 10/2000 | Kennedy |
| 6,505,236 | B1 * | 1/2003 | Pollack ....................... 709/206 |
| 6,609,138 | B1 | 8/2003 | Merriam |
| 6,944,651 | B2 | 9/2005 | Onyon et al. |
| 6,944,815 | B2 | 9/2005 | Bierbrauer et al. |
| 6,983,308 | B1 | 1/2006 | Oberhaus et al. |
| 7,031,973 | B2 | 4/2006 | Natarajan et al. |
| 7,054,905 | B1 * | 5/2006 | Hanna et al. .................. 709/206 |
| 7,113,948 | B2 * | 9/2006 | Jhingan et al. ................. 707/10 |
| 7,369,260 | B2 * | 5/2008 | Buschi et al. ................. 709/206 |
| 2001/0054073 | A1 * | 12/2001 | Ruppert et al. ............... 709/206 |
| 2003/0177171 | A1 | 9/2003 | Brown, Jr. et al. |
| 2004/0064733 | A1 * | 4/2004 | Gong ........................ 713/201 |
| 2004/0158607 | A1 * | 8/2004 | Coppinger et al. ........... 709/206 |

(Continued)

FOREIGN PATENT DOCUMENTS

EP    1689137 A1    8/2006

(Continued)

OTHER PUBLICATIONS

Chapter 1—MS Outlook 98 Overview http://www.microsoft.com/technet/archive/office/office97/proddocs/deploy/chpt1.mspx?mfr=true.

(Continued)

*Primary Examiner*—Hassan Phillips
(74) *Attorney, Agent, or Firm*—Merchant & Gould PC

(57) ABSTRACT

Client side based data synchronization and storage is accomplished through a smart way of data off-lining coupled with a synchronization technique implemented on the client side that does not require any modifications to the server side. The customized client utilizes the server as a temporary placeholder for document synchronization. Attached documents to an item will be off-loaded from the client based on a predetermined policy. The clients make off-line copies of the items and documents. The server will maintain only the document store skeleton or metadata for such processed items. Any client which has not made an off-line copy of an item will pass a synchronization request via the server to the other clients so that at least one of its peers may upload the document onto the server. The requesting client can then retrieve the item from the server and synchronize/off-line that item on its local store.

8 Claims, 8 Drawing Sheets

U.S. PATENT DOCUMENTS

| | | | |
|---|---|---|---|
| 2004/0172423 A1* | 9/2004 | Kaasten et al. | 707/201 |
| 2004/0186894 A1* | 9/2004 | Jhingan et al. | 709/207 |
| 2005/0076085 A1* | 4/2005 | Budd et al. | 709/206 |
| 2005/0076087 A1* | 4/2005 | Budd et al. | 709/206 |
| 2005/0114450 A1* | 5/2005 | DeVos | 709/206 |
| 2006/0020674 A1 | 1/2006 | Bruce et al. | |
| 2006/0031309 A1* | 2/2006 | Luoffo et al. | 709/206 |
| 2006/0047756 A1* | 3/2006 | Piispanen et al. | 709/206 |
| 2006/0248155 A1* | 11/2006 | Bondarenko et al. | 709/206 |
| 2006/0248579 A1* | 11/2006 | Gerritsen et al. | 726/9 |
| 2007/0180035 A1* | 8/2007 | Liu et al. | 709/206 |
| 2008/0183824 A1* | 7/2008 | Chen et al. | 709/206 |
| 2009/0248808 A1* | 10/2009 | Izumi et al. | 709/206 |

OTHER PUBLICATIONS

POST: A Decentralized Platform for Reliable Collaborative Applications http://www.cs.rice.edu/~amislove/publications/POST-Thesis.pdf.

Kerio Centers Latest Version of Mail Server Around Collaborative Apps http://www.serverwatch.com/news/article.php/1563891.

WorldClient—Web Mail for MDaemon http://www.altn.com/Products/MessagingSolutions/MDaemon/WebMail/.

* cited by examiner

CLIENT SIDE BASED DATA SYNCHRONIZATION AND STORAGE

BACKGROUND

This application relates to shared data store implementations, such as a mailbox or public folders, and more particularly, to a client side based data synchronization and storage solution to problems currently facing such shared data store implementations.

In a typical shared data store implementation, such as a mailbox or public folders, the updated data store structure and the contents are kept available and updated by a server. The clients' document stores are synchronized with their associated server(s). This architecture requires a huge server storage capacity and fast data access to support a typically large client base. As the client base continues to grow over time, it becomes increasing difficult to provide a large storage quota on the server for each client.

The server is responsible for managing a large number of accounts associated with the clients it serves. As the number of clients and associated accounts grow, maintaining a workable storage allotment for each client becomes problematic, requiring ever increasing hardware resources and increased expense. As clients begin to reach their storage limits, they may be required to spend time managing their account through periodically archiving data, and possibly establishing smart rules to help handle the storage load. However, once account items are moved to an archive, a majority of the online useful functionalities for those items is lost.

Another aspect compounding this problem is that a user may access his or her account from more than one client. The user may access his or her account from a desktop computer or laptop computer while in the office, a home computer or laptop computer when at home, or a personal digital assistant ("PDA"), laptop computer, or other portable computing device when traveling. Synchronization between the different clients can be problematic.

Analysis has shown that an average of between 70-80% of the storage space in a typical account is consumed by attachments for items stored in the account. These attached files and/or other types of attachments are the major consumers of space allotted for the account. For example, in a typical email server/client case a typical text/html email message without any attachments may require around two KB of memory, while the size of an average attachment requires around one MB of memory. Statistically, if the one MB attachment were removed, additional space would be freed up for storing approximately 600 more email messages. This condition is even worse if the mailbox contains multimedia attachments to the emails. Multimedia attachments are typically meant to be viewed once and deleted, but in most cases, they remain in the mailbox holding storage space equivalent to thousand of email messages. Also, users often tend to be undisciplined with management of the emails, such that the mailbox size may reach the maximum limit at inopportune times, forcing the user to stop what they are doing in order to delete or archive messages from their mailbox so that they can receive new items. Typically clients work on a single off-line data file, like an ".ost" file for Microsoft® Outlook®. This file grows with mailbox storage usage and the off-line features that are set. Working with such a single large off-line data file does not deliver high client performance. Also, this situation is not highly scalable.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

This application describes a smart way of data off-lining coupled with a synchronization technique implemented on the client side that addresses the problems noted above. The client utilizes the same server for implementing the synchronization technique by using the server as a temporary placeholder for document synchronization. The clients will make off-line copies of the items and documents as soon as possible, typically when an item is created or arrives on the client. Attached documents to an item will be off-loaded from the client based on a predetermined policy, typically at a later time from the off-lining. The server will maintain only the document store skeleton or metadata for such processed items. Any client which has not had the opportunity to make an off-line copy of an item will pass a synchronization request via the server to the other clients so that at least one of its peers may upload the attachment onto the server. The requesting client can then retrieve the item from the server and synchronize/off-line that item on its local store. This approach does not mandate any changes on the server side or in the server configuration setup. Straightforward customization in the client user interface ("UI") enables the client to deal with the full version of the item and the off-loaded version of the item in a consistent way.

DETAILED DESCRIPTION

The invention may be implemented as a computer process, a computing system or as an article of manufacture such as a computer program product. The computer program product may be computer storage medium readable by a computer system and encoding a computer program of instructions for executing a computer process. The computer program product may also be a propagated signal on a carrier readable by a computing system and encoding a computer program of instructions for executing a computer process.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
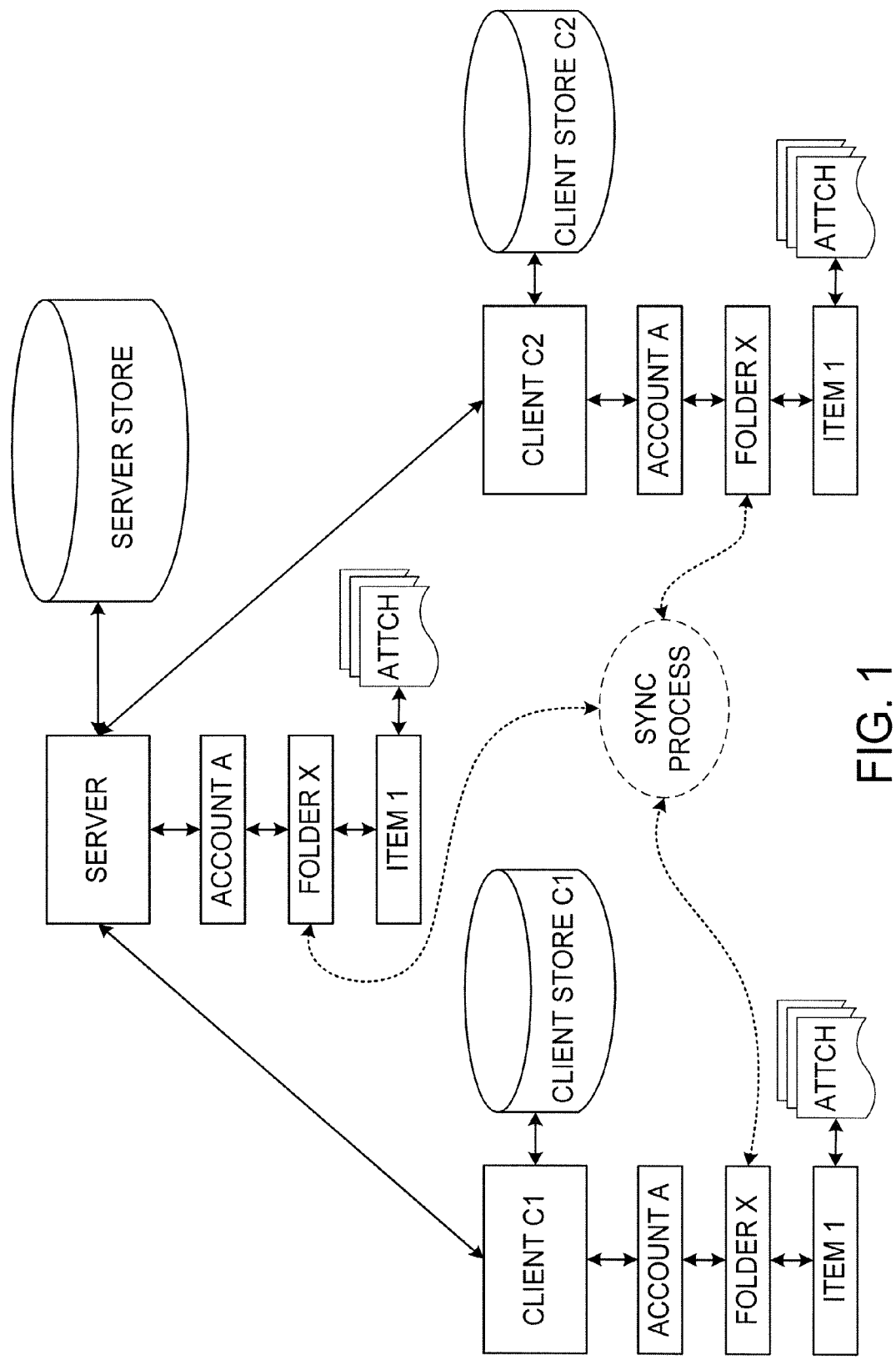
FIG. 1 shows a schematic/block diagram of an embodiment of a client-server environment for a shared data store suitable for implementing client side based data synchronization and storage.

Referring now to the Figures, in which like reference numerals and names refer to structurally and/or functionally similar elements thereof, FIG. 1 shows a schematic/block diagram of an embodiment of a client-server environment for a shared data store suitable for implementing client side based data synchronization and storage. The terms used in the discussion that follows are described below.

Server—The Server is a software piece typically running on a high performance dedicated machine having large data storage capacity. The Server provides accounts to its clients. There is usually a set storage quota for each account based upon a policy. The Server can also manage shared folders independent of any account. For example, the Server could be an email server providing email accounts to its users with a specific quota for storage for each account. Examples of such Servers include Microsoft® Exchange Server and Lotus Domino Server.

Account—The Server creates and manages multiple Accounts. An Account is used to allocate and manage Server resources in an isolated and secure manner. Based on Account settings and policies, the resource allocation and its treatment could be different for different Accounts in the same Server. A client's view of the Server is its Account on the Server. Examples of such Accounts include Microsoft® Exchange Server Account and Lotus Notes® Account.

Client—The Client is a software piece running on a user end machine. Examples of such Clients include Microsoft® Office Outlook® Client and Lotus Notes® Client. A Client can manage multiple Accounts. It is responsible to communicate with the Server and to keep the Accounts updated. Typically, the Client provides ways to handle the actual Account items such as mail or post. The Client can also provide off-line capability where it allows the user to work with the Account even if there is no Server connectivity. The Client synchronizes the Account view when the connection is restored. The Client provides ways to manage Accounts, like creating folders, rules, etc. The Client can create, modify or delete, and thus manages the folders, items and documents under a managing Server Account. Examples of such Accounts include Microsoft® Exchange Server Account or a Lotus Notes® Account.

Client Store—A Client Store can be a local hardware data storage facility (e.g. dedicated file/space on a hard disk). For performance purposes and for off-line capability the Client maintains the Account view locally. In the case of Microsoft® Office Outlook® Client it is in the form of an ".ost" file on the local hard disk. The Client Store for off-lined body parts/attachments may use a folder in the local drive, possibly by employing appropriate security policy. When referred to in the figures and in the written description, Client Store means the local storage facility available to the Client where these ".ost" file(s) and off-lined item's parts can reside.

Item—An Item is an entity under synchronization. An Item may contain a body, metadata, and attached documents. An example of an Item could be an email or a post. The metadata of an Item contains its properties and header information. The body is the text or HTML part of the Item. Attachments contain documents or Multipurpose Internet Mail Extensions ("MIME") parts. It is easily observed that the attachments of an Item typically contribute the most to the overall Item size. The Item can contain custom properties as part of its metadata. Examples include email, post, contacts, and documents of a Microsoft® Exchange Server Account or a Lotus Notes® Account.

Off-Lining or Off-Lined Item—When an Item, such as an email for example, arrives, the Client will copy its bulky parts locally, which are mainly its attachment(s) or MIME body parts. Off-lining is done as soon as possible, that is when an Item is created or arrives on the Client. These Item's parts are identified by an ID, such as attachment number or content URI (Uniform Resource Identifier)/ID in the case of Outlook. The Client only makes copy of the Item's parts and saves them in a local folder (Client Store), and possibly with encryption in accordance with the account security settings. These saved Item parts are identified by their parent item identifier and their respective IDs. This information can be kept separately in an operational DB or as the part of file name itself. The original item is not modified in any way during the off-lining process. Also the Client will make off-line copies for only those Item's parts which are candidates for off-loading when applied to the Item in future as decided by the off-loading policy, which may be altered or changed from time-to-time. Thus the off-loading policy plays two roles: determining which parts of an Item are to be off-lined, and deciding which parts of an Item are to be off-loaded from the Item. There is a one-to-one mapping between local off-line Item parts and place holders in the off-loaded Item.

Off-Loading or Off-Loaded Item—Off-loading is a process where an Item is stripped to get rid of its bulky parts, mainly attachments(s) and/or MIME parts based on a set policy that have already been off-lined. The Client can periodically check for any possible off-loading opportunity for Items under its account management. If the policy allows an Item to be considered for off-loading, then the Client removes the attachment(s) and/or MIME body parts and deletes them. The Client will put the metadata information in the Item (as part of its custom properties or otherwise) regarding which parts have been removed, their ID, size etc. This extra information allows the Client to deal with this Item in a special way so that it can offer appropriate UI and behavior to the user. This extra information will specifically serve two purposes. The first is to fetch Item body parts/attachment(s) from the local Client Store when the item is viewed by an end user. The second is to update the local Client Store for the Item's parts for which it has missed the opportunity for off-lining. This update is requested/served by post message based Sync Process described below. It is to be noted that the sync update is only required in the case where a specific Client has missed the off-lining opportunity for an Item (such as occurs when a specific Client receives an Item from the Server which has been already off-loaded by some other Client.). If every Client is online most of the time, and the policy is such that it allows a moderate shelf-life for any Item before off-loading, then this scenario is unlikely to arise.

Off-Loading Policy—An Off-Loading Policy utilizes variables such as attachment size, Item life, importance, or any other Item properties to determine what is to be off-loaded. One simple and typical policy could be based only on size and duration. For example, if an Item's attachment(s) size is more than 500 KB and the Item is older than three days, then off-load the attachment(s) from its parent Item. The Off-Loading Policy may be changed from time-to-time.

Folder—A Folder is a collection of Items and sub-folders. Folders make it convenient to deal with a large collection of Items in a hierarchical manner. Typically, an Account's Folder hierarchy on the Server is maintained on the Client side. Folders help the sync process to optimize overall performance, as it is possible to have customized Folder sync rules for different Folders in the same Account.

Sync Process—The Sync Process is a periodic synchronization process, which keeps the Account's view on the Server and the Clients updated. The Sync Process is initiated when a Client requests Folder updates from the Server. Each such Sync Request is a two step send-receive process. The Client updates the Server for the uncommitted and recent changes made at its side, and the Server updates the Client for the new changes that have occurred in the Server's view. The Sync Process may put an Item into a conflict state if that Item is modified on two different Clients in different ways without having the intermediate changes updated on the Server.

Referring now to FIG. 1, the above set of definitions are applicable to a Server, such as a Microsoft® Exchange Server or Lotus Domino Server, and a Client, such as a Microsoft® Office Outlook® Client or Lotus Notes® Client. The Server provides email Accounts to its users and stores all Accounts on the Server Store. With an Account A the user has an email ID and the mailbox store on the Server Store. A user typically uses one or more Clients, such as Client C1 or Client C2 shown, to manage the Account A on the Server. Users may use Client C1 or Client C2 to manage their emails, posts, calendars, contacts, documents, etc. Client C1 has Client Store C1, and Client C2 has Client Store C2. The user may have at least one Folder X containing at least one Item (Item 1 in FIG. 1), which may have one or more attachments (ATTCH in FIG. 1). Through the Sync Process, each client, Client C1 and Client C2, as well as the Server, will have the same Item 1 with any attachments in Folder X associated with Account A.

The communication protocol for Microsoft® Outlook®/ Exchange is based on Microsoft's messaging technology called Messaging Application Programming Interface ("MAPI"). In Outlook®/Exchange each Item is represented by a message. A message type or class could be mail, post, contact, etc. Messages have "property bags," where native and custom properties can be stored as name-value pairs. A "property bag" is a data structure that acts as a "container" (a bag) to store different types of properties.

This messaging framework is quite extensible. For example, it is possible to define a message extension loaded with custom properties and have its behavior customized. Microsoft® Office Outlook® Client also provides a very rich extensibility model of programmability. The Client may be customized to handle extended responsibility. It allows custom code to access Outlook® application objects and to customize the UI.

The Server is responsible for managing a large number of Accounts. Users frequently utilize more than one computing device containing the Client (Client C1, Client C2, etc.) to connect to the same Account. For example, the user may use as an office desktop computer or laptop computer when in the office, a home computer or laptop computer when at home, or a PDA, laptop computer, or other portable device when traveling, each having the Client installed on the device. Maintaining many Items online on the Server is often very desirable by users. However, there is no effective "out-of-the-box" solution for archive synchronization across different hardware devices. Users typically complain about their Account quota size, and enterprises are often constrained in setting the limits on the size of the Account they would like to grant to each user by hardware and budgetary limitations.

FIGS. 2A-2K show an implementation of a method for client side based data synchronization and storage for shared data store environments consistent with the environment as described in FIG. 1. In overview, a set of separate procedures are implemented. This implementation uses off-lining, off-loading, sync process, and update procedures in a smart way to overcome the various problems discussed above. For the purpose of simplicity, only an attachment to an Item will be used as an example of the off-lining strategy. In general, it could be any part of the Item based on the filter logic and off-lining policy. The following is a brief description of the different procedures employed.

Initial Off-Lining. First, any attachment will be off-lined as soon as possible. For example, when an Item is received by a Client, an off-line copy of the Item's attachment(s) are made as soon as the Item arrives on the Client Account and stored in the Client Store.

Off-Loading. The attachment(s) from an existing Item will be off-loaded from the Item and stored in the Client Store after a period of time based on a predetermined policy. For example, a policy can say that an Item's attachment will be off-loaded if the attachment size is more than 50 KB or two MB or whatever size is deemed relevant to a particular environment, and the Item is older than two days, or three days, or a month or whatever time frame is deemed relevant to a particular environment. Checking Items to be off-loaded may be scheduled with some arbitration on a random basis to avoid the remote possibility of putting the Item in conflict. Even then if the off-loading process leaves any Item in the conflict state, it will be appropriate to resolve it automatically as the resultant change would be similar. The Client which off-loads the attachment(s) from the Item puts a custom text or XML name-value pair in the Item's property bag. This will be the metadata for the off-loaded attachment(s) for that Item. This information will be used to provide the UI and data for the Item's attachment handling. This metadata will also be used while preparing the request message to supply the missing attachment(s)' data for the Item.

In one embodiment of the off-loading process, an Item-A has attachment-1, attachment-2, attachment-3, . . . attachment-n as attachments. These attachments could either be normal Item attachments or MIME body parts or a combination of both. Based on the Off-Loading Policy, at least a subset of the attachments are to be removed from Item-A. The set of off-loaded parts for Item-A comprises r elements 1 . . . r. So for each element in the off-loaded parts for Item-A the client will put information back into the item so that it can be dealt appropriately in future. A basic scheme for this information is as follows:

---
Item Id
Off-loaded Date Time Stamp
Off-loading Client ID
Total Body Parts Off-Loaded
Original Size
Policy ID Used For Off-Loading
---

And each of off-loaded body parts will have as a set of properties:

---
Part-Id
Part-Number
Part-Display Name
Part-Size
Part-CRC (Cyclic Redundancy Check)
---

The above information can be stored in the Item in way that is suitable (and possible) for the Client. In Outlook this could be done by putting the custom item property in an item. This above information group can easily be represented using a simple XML block or CSV (comma-separated values)/URI encoded string. If a Client does not have such capability other techniques can be employed, like modifying the Item's body or managing post messages as an information database in the account for such information storage and retrieval. Any such technique may be utilized as long as it ultimately allows all the Clients managing the Account to retrieve this information on a demand basis (preferably even when the Client is disconnected from the Server).

The server will maintain only the document store skeleton or metadata for such processed items, referred to as an off-loaded version of the Item. That is, when a Client synchronizes with the Server and the Client receives an Item with an attachment(s), the attachment(s) are deleted from the Server Store, and only the off-loaded version of the Item is stored on the Server Store.

Checking Consistency and Requesting Sync. If the Account is operated on by several different pieces of hardware, i.e., if there are several Clients managing it, it could be possible that one or more of the Clients will receive the Items in their Client mailbox after a delay of some period of time and after the attachment(s) have already been off-loaded. So, it is possible that the current Client is left with an off-loaded version of the Item for which the current Client does not have the associated attachment(s) in their local Client Store. In this case the deprived Client will post a request message to a special Folder (e.g., a Sync Post Folder) giving detail of the missing data and its identity, etc. The current Client then waits for a response from one of the other Clients. The current Client could either listen for new Items in the Sync Post Folder, or it can periodically perform a search. When the current Client gets a response post message for its request, the current Client updates its local Client Store, storing the attachment(s) and other information. The current Client then deletes its initial request from the Sync Post Folder.

Responding to Sync Request. The Client listens or periodically checks for any new request arriving on the Sync Post Folder. The Client checks to see if any of the other Clients have responded to the request, and if not, if the Client can fulfill the request. If the Client can fulfill the request, the Client creates a response post message in the Sync Post Folder. This response will be built supplying all the requested information and attachment(s). The Client will delete at any time the response messages that it posted for which there is no longer a corresponding request message.

Client Customization. Apart from the above procedures, customization of the Client UI is necessary in order to deal with the full version of the Item and the off-loaded version of the Item in a consistent manner. The shelf life of fresh or updated Items is determined by the off-loading policy. If the attachment(s) are off-loaded from an Item, the UI should provide a way to view and act on the associated Item's attachment(s). The actual data for the attachment(s) will be fetched from the local Client Store on a demand basis.

Referring now to FIGS. 2A-2K, the method shown assumes a separate Folder for sync request and response post. A separate Folder is not mandatory, and is employed in this discussion because it is easier to explain the implementation. For this discussion, three Clients are shown, namely Client C1, Client C2, and Client C3 that are managing a Server Account A. One skilled in the art will recognize that fewer or more Clients than the three shown may be used. The dedicated Folder is called Sync Post in the Account view. The following illustrates the basic Account view setup required.

Figure 2A:
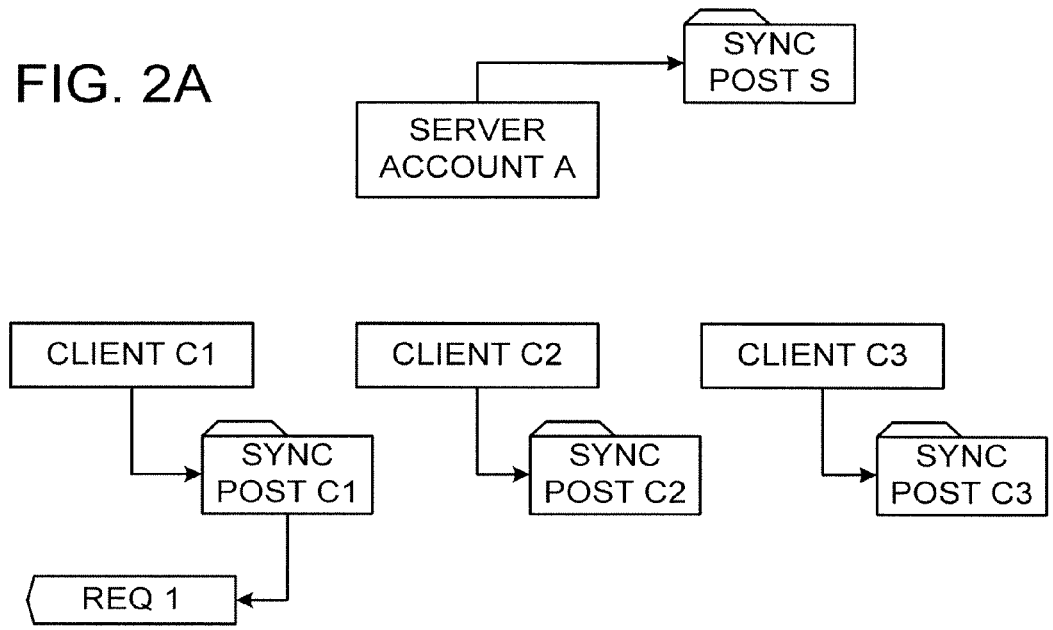
FIG. 2A shows a block diagram of creating a sync request message and posting it to the sync folder for Client C1.

In FIG. 2A, Client C1 Access Account A and receives Item 1, whose attachment(s) have already been off-loaded by either Client C2 or Client C3 (Client C2 in this example). Client C1 recognizes that it has an off-loaded version of Item 1 and that Client Store C1 does not have the attachment(s). Client C1 creates Sync Request Message ("REQ 1") requesting the attachment(s) for Item 1 and posts it in the Sync Post C1 Folder.

Figure 2B:
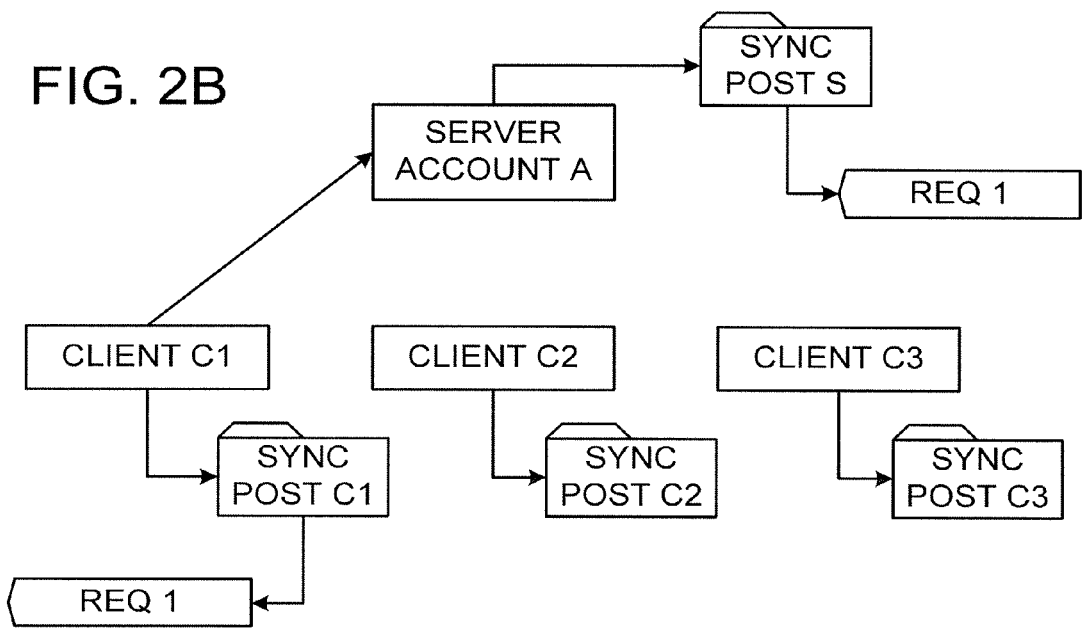
FIG. 2B shows a block diagram of the request post synced to the server account view.
Figure 2C:
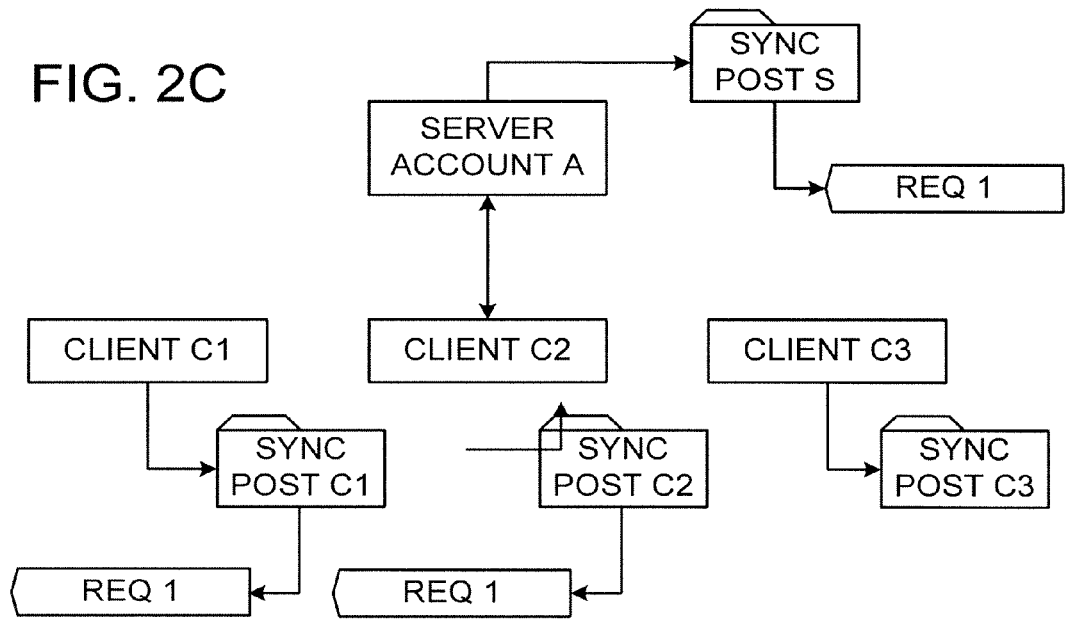
FIG. 2C shows a block diagram of the next sync cycle of Client C2, where the request post appears in Client C2's account view.
Figure 2D:
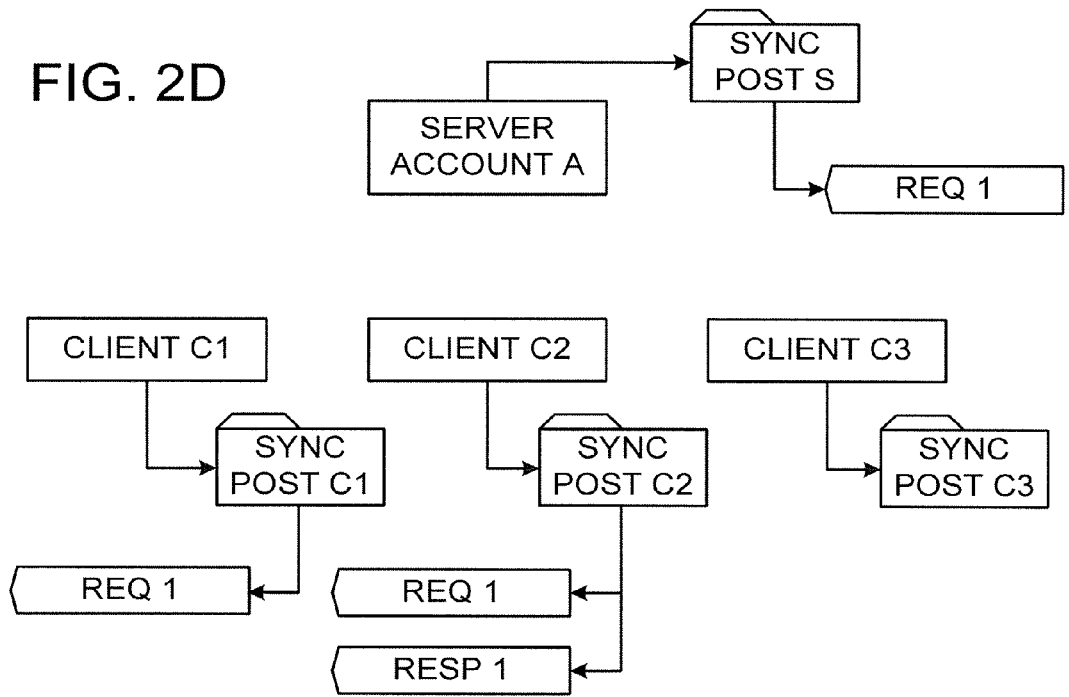
FIG. 2D shows a block diagram of Client C2 preparing a response post according to the request and posting it to the sync folder for Client C2.

In FIG. 2B the REQ 1 post is synced to the Server Account A view in the Sync Post Server Folder ("Sync Post S"). In FIG. 2C in the next sync cycle of Client C2, the REQ 1 post now appears in Client C2's view in the Sync Post C2 Folder. Client C2 in FIG. 2D sees that there is no response yet for the REQ 1 post, and Client C2 recognizes that it can fulfill this request. Client C2 prepares a Sync Response Message ("RESP 1") post according to the REQ 1 and posts it on the Sync Post C2 Folder. RESP 1 contains the attachment(s) for Item 1. In one embodiment, the structure of REQ 1 may contain the following details:

---
Request Header
Request-Verb
Request-Msg-ID
Transaction-ID
Source-Client-ID
Target-Client-ID (optional)
Request-Creation-Datetime
Requested Parts Details
    Item-ID-1, part-ID-1, part-ID-2, . . .
    Item-ID-2, part-ID-2, . . .
---

The above information will be used to fill the sync request message. This information can be put inside the message as body or subject (or a combination of both). The format could be simple XML or a URI-encoded string. The implementation framework of the Client will decide the appropriate technique. A typical response for the above request message post could be as follows. In one embodiment, the structure of RESP 1 for the above request message post could contain the following details:

```
Response Header
Request-Verb
Response-Msg-ID
Transaction-ID
Source-client-ID
Target-Client-ID (optional)
Response-Creation-Datetime
Payload Details For The Requested Parts
    Item-ID-1, part-ID-1, payload-ID-1, size, encoding
    Item-ID-1, part-ID-2, payload-ID-2, size, encoding
    . . .
    Item-ID-2, part-ID-r, payload-ID-r, size, encoding
    . . .
```

Apart from the above response text the response post message contains attachments as payloads as detailed above. The payload attachments will serve as binary data to regenerate off-line copy of Items' off-loaded parts at the requesting Client end. Again, some encoding rules may be applied like compression and encryption in accordance with Account settings.

Figure 2E:
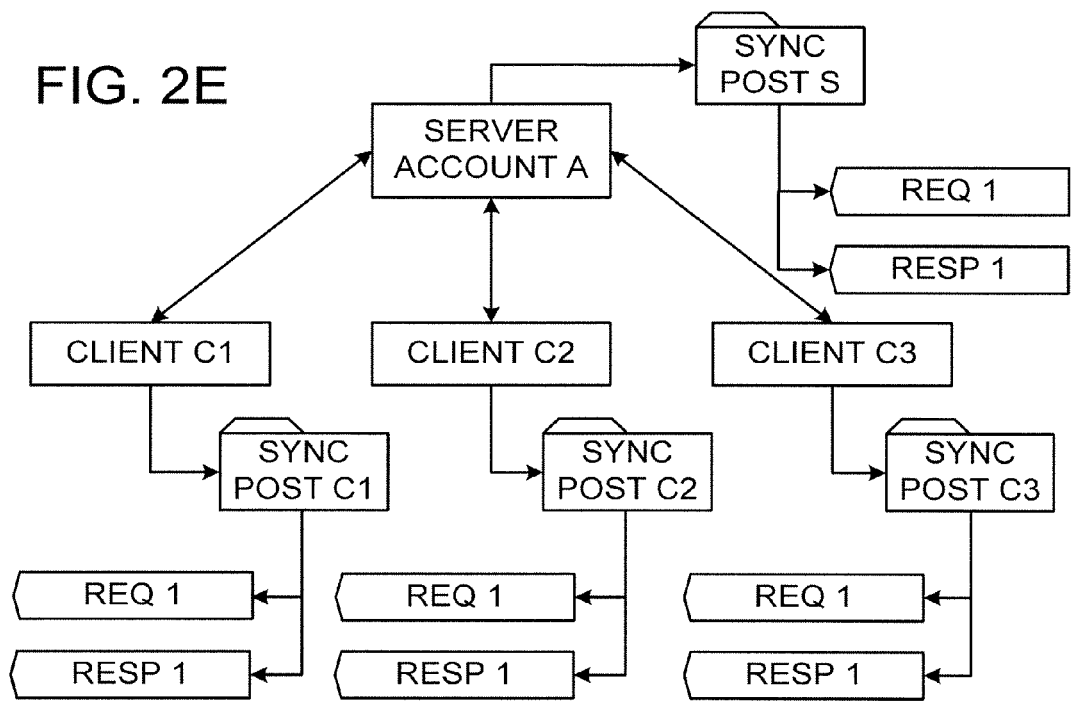
FIG. 2E shows a block diagram of Client C1 processing the response message to update its local store.
Figure 2F:
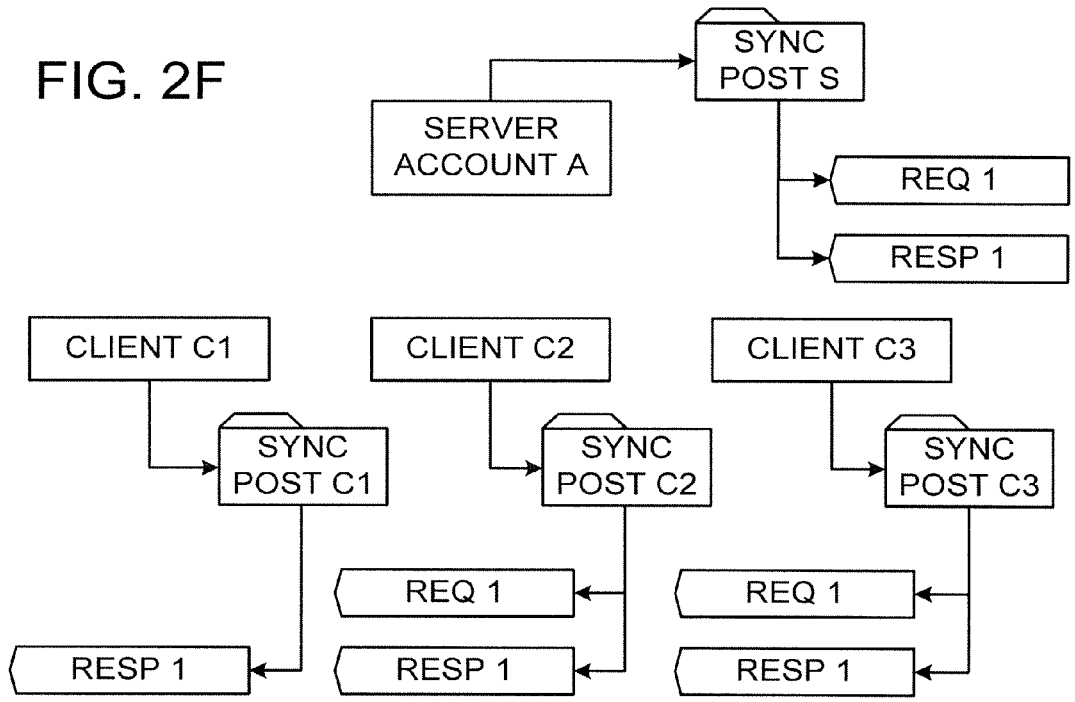
FIG. 2F shows a block diagram of Client C1 deleting its request post from its sync folder.

In FIG. 2E in the next series of send-receive sync cycles the RESP 1 post will be synchronized and appear in each of Client C1 and C3's views in their Sync Post C1 and C3 Folders and in the Sync Post S Folder of Server Account A. Client C3 also receives the REQ 1 post at this time. Requesting Client C1 notices the RESP 1 post for its REQ 1 post. Client C1 starts processing the RESP 1 message to update its Client Store C1 with the attachment(s) for Item 1. After processing the RESP 1 post Client C1 in FIG. 2F deletes its REQ 1 post from its Sync Post C1 Folder.

Figure 2G:
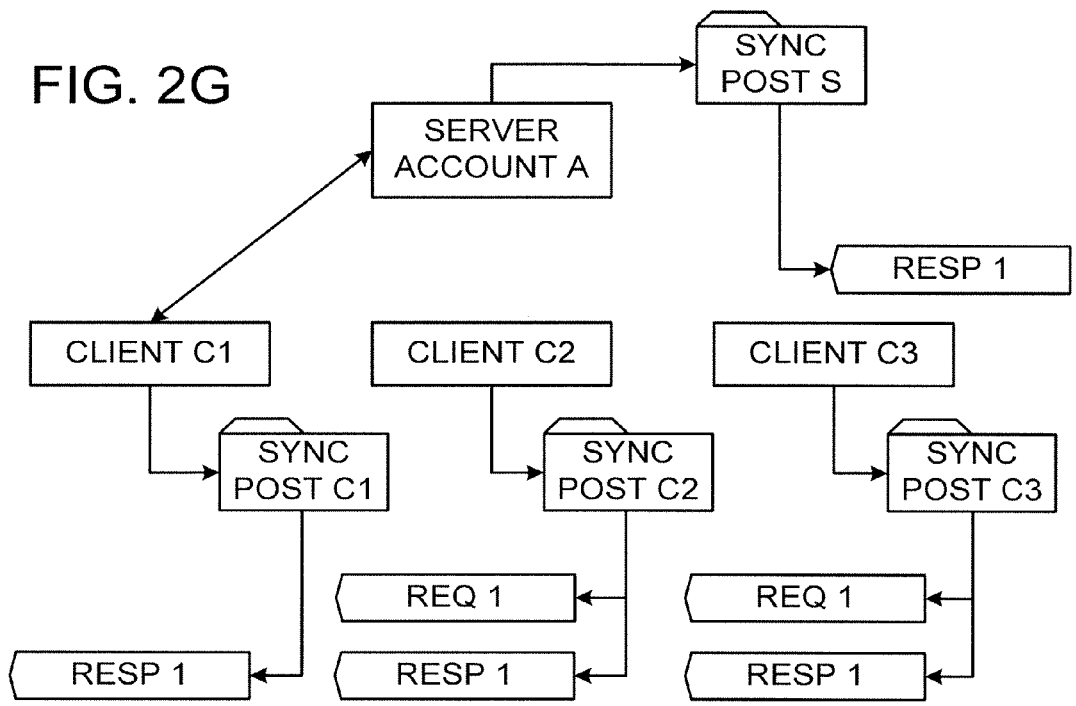
FIG. 2G shows a block diagram of the request being deleted from the server account's sync folder.
Figure 2H:
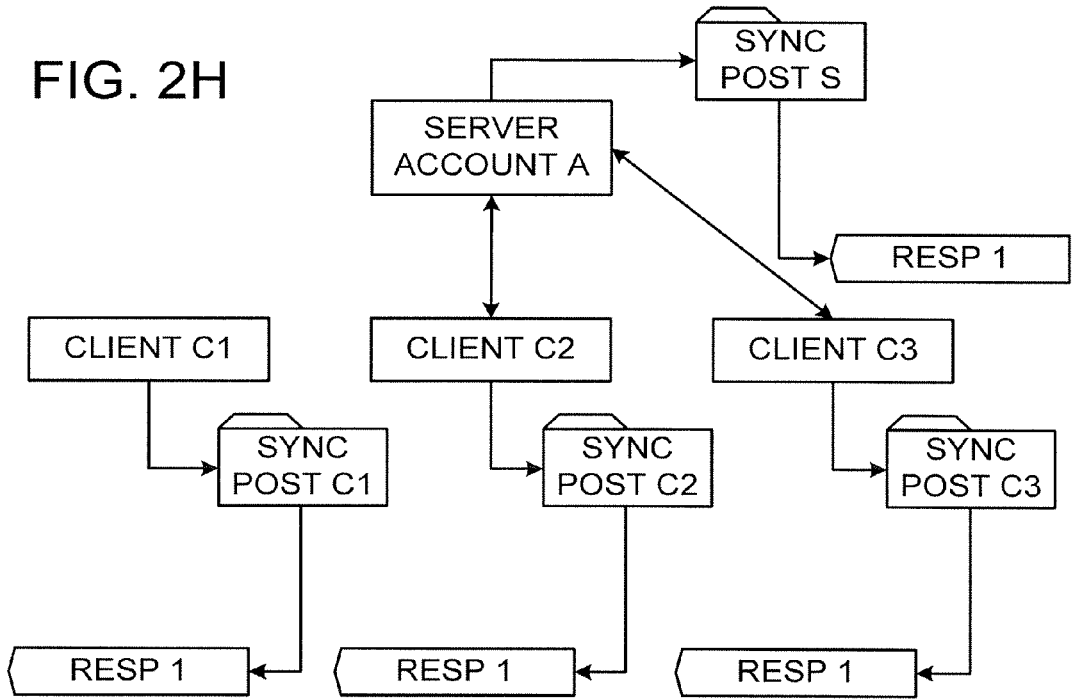
FIG. 2H shows a block diagram of the request being removed from Client C2 and Client C3's view in their sync post folders.
Figure 2I:
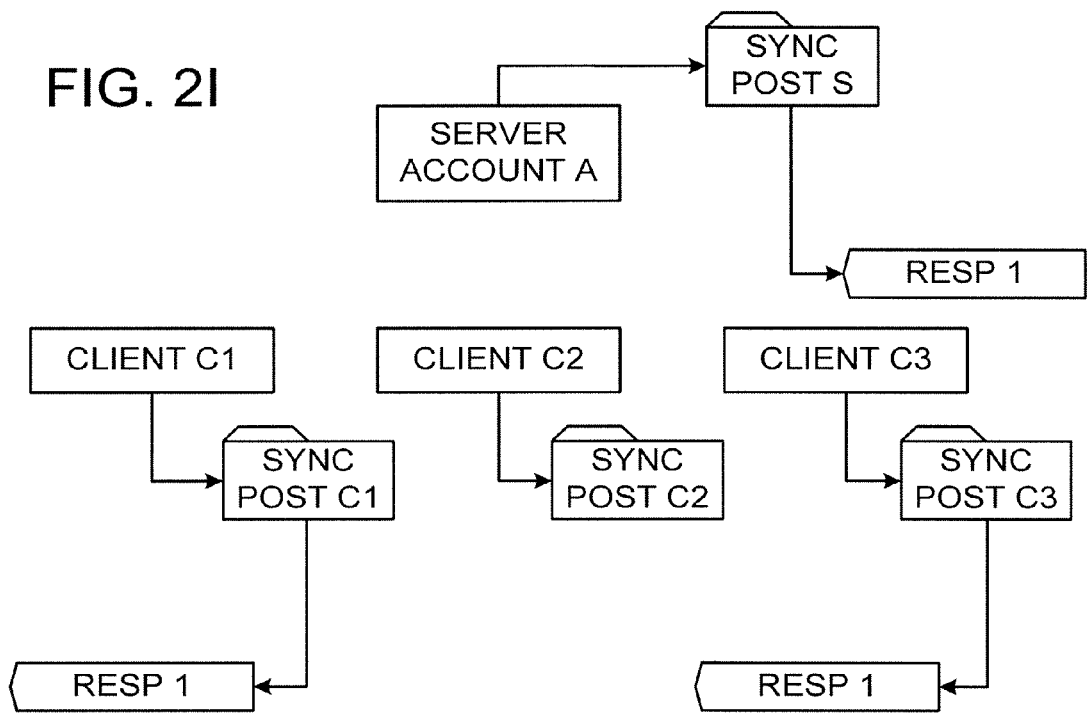
FIG. 2I shows a representation of Client C2 observing that the request for the response it has posted is no longer in the folder, so it deletes the response.
Figure 2J:
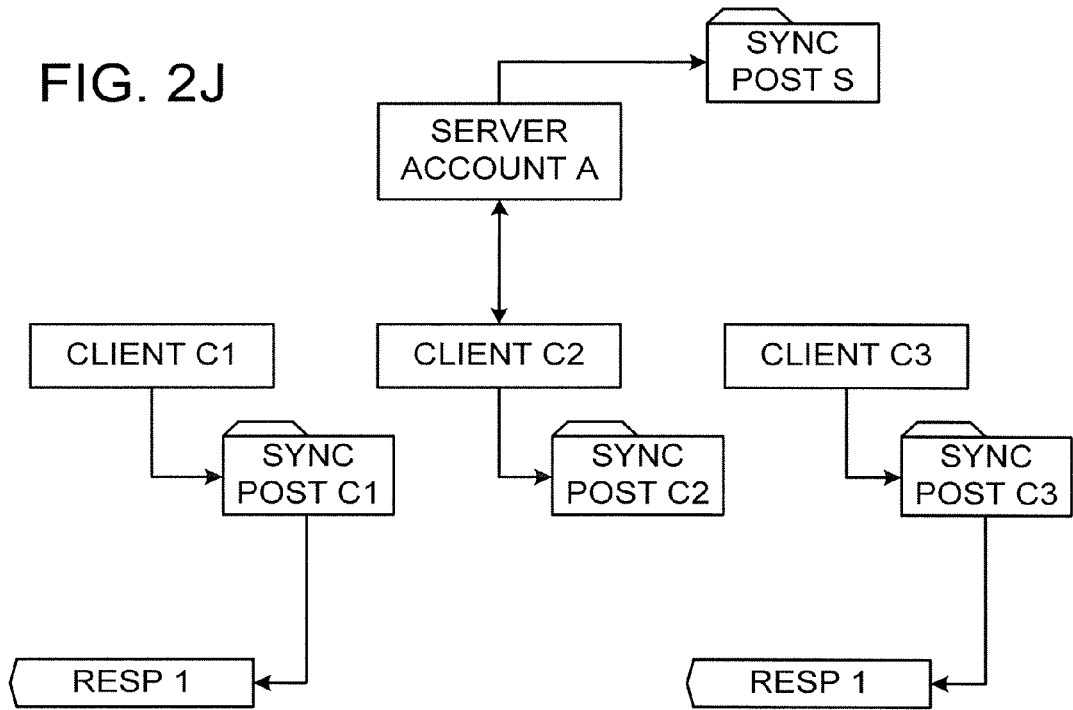
FIG. 2J shows a block diagram of the response being removed from the sync post folder of the server account.
Figure 2K:
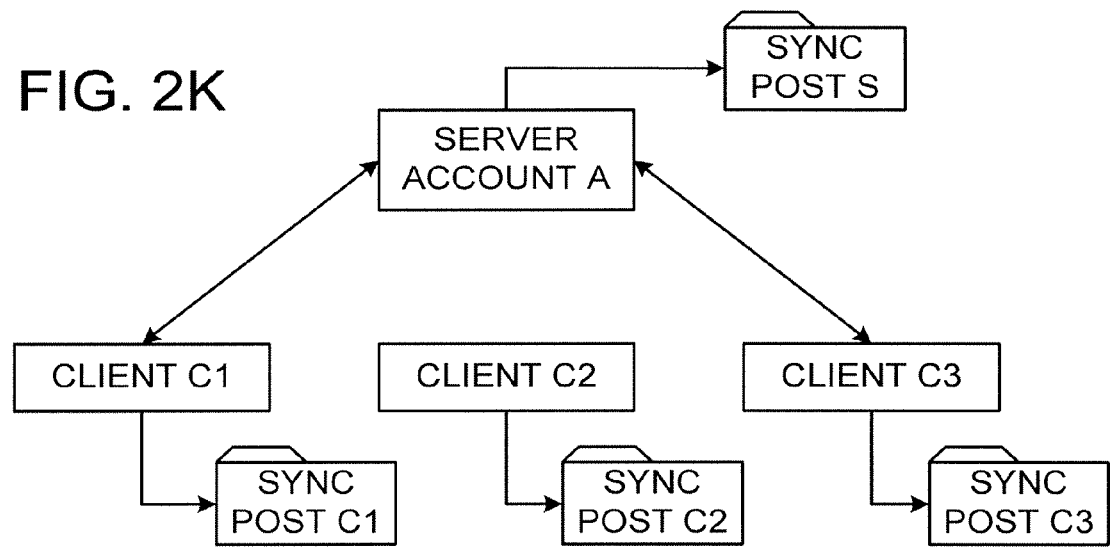
FIG. 2K shows a block diagram of the response being removed from Client C1 and Client C3's view in their sync post folders in the next send-receive sync cycle.

In FIG. 2G the REQ 1 post is also deleted from the Sync Post S Folder view from Server Account A. In the next send-receive sync cycle REQ 1 post is removed from Client C2 and C3's views in their Sync Post C2 and C3 Folders as shown in FIG. 2H. In FIG. 2I Client C2 recognizes that the REQ 1 post is no longer in the Sync Post C2 Folder, so Client C2 deletes RESP 1. RESP 1 is next removed from the Sync Post S Folder of Server Account A's view as shown in FIG. 2J. In FIG. 2K in the next send-receive sync cycle RESP 1 is removed from Client C1 and C3's views in their Sync Post C1 and C3 Folders. Thus, after synchronization, all three Clients, C1, C2, and C3, now each have in their Client Store C1, C2, and C3 respectively a copy of the attachment(s) for Item 1 as well as an off-loaded version of Item 1 in their Account A.

Implementing this technique requires modification or extension of existing Clients, which may not always be possible for every existing Client. Microsoft® Office Outlook® Client provides an extensible model for making the modifications required without changing the Client code base. Other Clients, where this custom extensibility is not provided might require design and/or code changes. The approach described above relies on passing requests and responses as message posts. The underlying assumption is that there is a way to put additional information in the post Item, such as the name-value pairs described above. This model is very well supported in MAPI based Microsoft® Outlook®/Exchange messaging. In other systems it is may not be as straightforward to put custom properties in the message. Implementing this approach in other systems without any code/design change may require special handling of the post message's subject and body, which may result in a custom data schema.

Complete request processing takes a number of send-receive sync cycles, and it requires other Client peer(s) to be online to serve the request (but not necessarily at the same time). Thus, this approach may be too slow to be useful for activities that are subject to time-constraints, and thus this approach may be limited to those activities which are not very sensitive to time, such as, for example, background management activity. As most Clients can connect to the Server using http/https out of a corporate firewall, it makes sense to use this approach with degraded performance in other scenarios where direct peer-to-peer connections or a dedicated public Server is not possible.

Using this approach enables Clients to collaborate using the existing mail/messaging infrastructure (such as Microsoft® Outlook®/Exchange) in a new way across networks. Using a shared Server Folder for request/response posting by Clients of different or independent Accounts opens up alternate and new ways of using a message posting service. A formalized schema may be developed for the request/response data so different kinds of Clients may also collaborate in the process.

Figure 3:
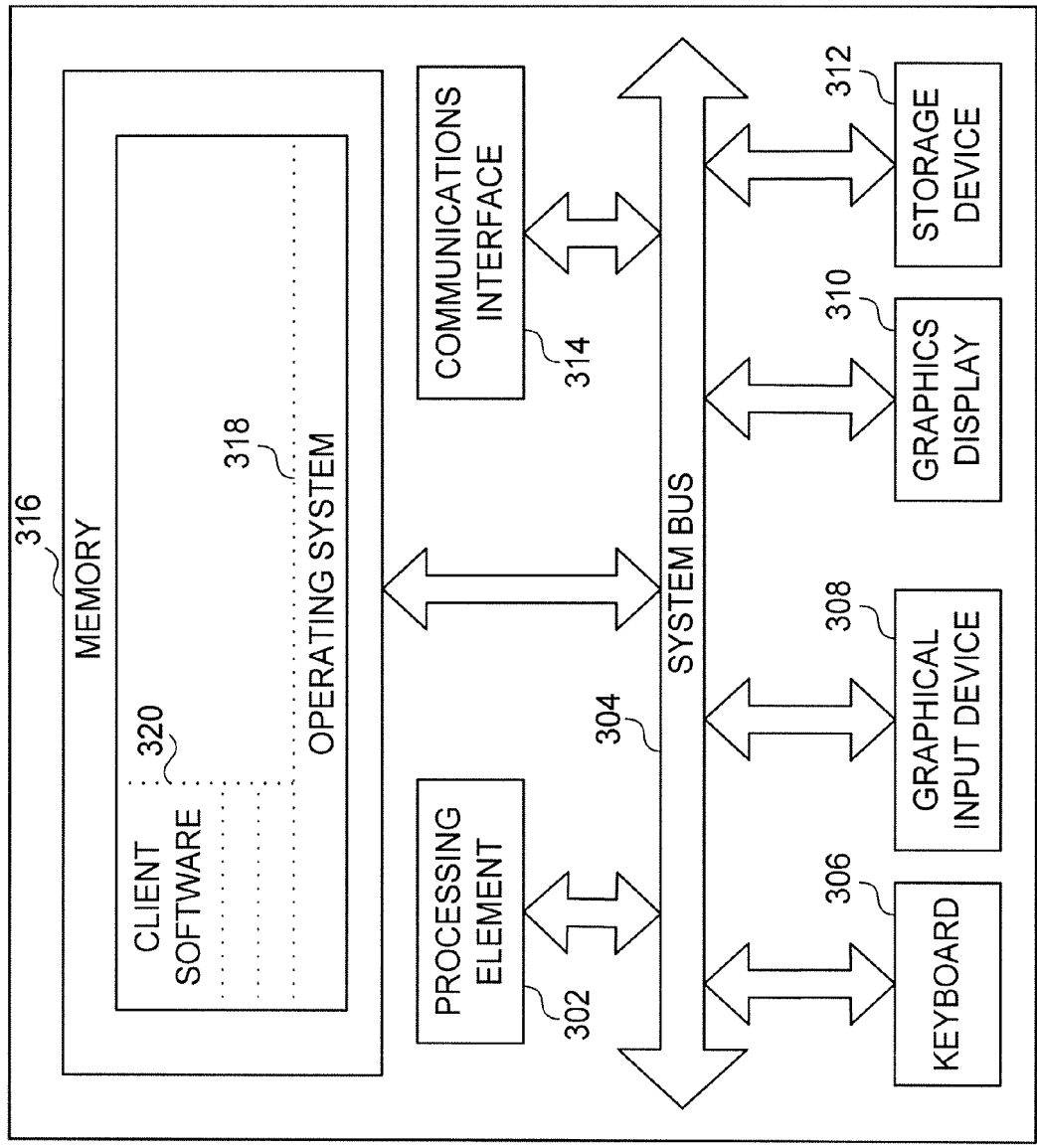
FIG. 3 shows a schematic/block diagram of an embodiment of a client computer system implementing client side based data synchronization and storage.

FIG. 3 shows a schematic/block diagram of a hardware device containing a client implementing client side based data synchronization and storage. The hardware device may be a desktop computer, laptop computer, personal digital assistant, or other portable computing device. One skilled in the art will recognize that the hardware device shown in FIG. 3 is just one of many different embodiments possible.

Referring now to FIG. 3, a Hardware Device 300 contains a Processing Element 302. The Processing Element 302 communicates to other elements of the Hardware Device 300 over a System Bus 304. A Keyboard 306 allows a user to input information into Hardware Device 300, and a Graphics Display 310 allows Hardware Device 300 to output information to the user. Graphics Display 310 may also be touch screen enabled, allowing a user to input information into Hardware Device 300 through this mode. Graphical Input Device 308, which may be a mouse, joy stick, or other type of pointing device, is also used to input information. A Storage Device 312 is used to store data and programs within Hardware Device 300. A Memory 316, also connected to System Bus 304, contains an Operating System 318, and Client Software 320 running in Memory 316. A Communications Interface 314 is also connected to System Bus 304. Communications Interface 314 may have one or more serial ports, parallel ports, infrared ports, and the like. Connectable through Communications Interface 314 may be an external printer or scanner, as well as access to a computer network (LAN or WAN), to the Internet, or to any other appropriate communication channel (not shown in FIG. 3) that allows Hardware Device 300 to communicate with other devices, such as the Server shown in FIG. 1.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications of the invention will suggest themselves without departing from the scope of the present invention.

What is claimed is:

1. A method for operation of a client computing device running client software for performing client side based data synchronization and storage, the method comprising the steps of:
   receiving, at a first client computing device, an item stored on a server store of a server managing an account accessible by the first client computing device, the item having at least one attachment;
   off-lining a copy of the at least one attachment onto a client store of the first client computing device;
   storing the item with the at least one attachment in a folder in the first client computing device;
   sending an off-loading instruction by the first client computing device to the server wherein the off-loading instruction instructs the server to delete the at least one attachment from the item stored on the server based on a predetermined off-loading policy; and
   synchronizing a sync post folder of the first computing device with a sync post folder of the server;
   receiving, at the first client computing device, a request message from a second client computing device, the request message requesting the at least one attachment stored in the folder in the first client computing device;
   posting, at the sync post folder of the first client computing device, a response to the request message received from the second client computing device, wherein the response includes the at least one attachment; and
   synchronizing the sync post folder of the first client computing device with the sync post folder at the server, wherein synchronization includes posting the response to the request message received from the second client computing device.

2. The method of claim 1 wherein the predetermined off-loading policy is based on one or more of:
   a size of the at least one attachment;
   a predetermined amount of time; or
   an item property of any type.

3. The method of claim 1 further comprising:
   deleting the request message from the sync post folder of the first client computing device; and
   deleting the response message from the sync post folder of the first client computing device.

4. A computer system for performing client side based data synchronization and storage, the system comprising:
   a server;
   an account managed by the server;
   a first client computing device in communication with the server for accessing the account;
   a client software running on the first client computing device, wherein the first client computing device receives an item from the account on the server, the item having at least one attachment;
   a client store in the first computing device for off-lining a copy of the at least one attachment of the item;
   a folder in the first computing device, wherein the item with the at least one attachment is stored;
   a server store in the server, wherein the server receives an off-loading instruction from the first computing device, wherein the off-loading instruction instructs the server to delete the at least one attachment from the item stored on the server store based on a predetermined off-loading policy;
   a sync post folder of the first client computing device for receiving a request message from a second client computing device, the request message requesting the at least one attachment stored in the folder in the first client computing device and for posting a response message to the request message, wherein the response message includes the at least one attachment; and
   a sync post folder of the server for receiving the response message from the sync post folder of the first client computing device.

5. The system of claim 4 wherein the first client computing device and the second client computing device are at least a one of:
   a desktop computer;
   a laptop computer;
   a personal digital assistant; and
   any other portable computing device.

6. The system of claim 4 wherein the predetermined off-loading policy for off-loading the attachment from the item is based on one or more of:
   a size of the at least one attachment;
   a predetermined amount of time; or
   an item property of any type.

7. A tangible computer readable storage medium storing instructions that, when executed by a processor of a first client computing device, cause the processor to perform a method for performing client side based data synchronization and storage, the method comprising the steps of:
   receiving an item stored on a server store of a server managing an account accessible by the processor, the item having at least one attachment;
   off-lining a copy of the at least one attachment onto a client store of the processor;
   storing the item with the at least one attachment in a folder in a storage device in communication with the processor;
   sending an off-loading instruction by the processor to the server, wherein the off-loading instruction instructs the server to delete the at least one attachment from the item stored on a server store of the server based on a predetermined off-loading policy;
   synchronizing a sync post folder of the processor with a sync post folder of the server;
   receiving, at the sync post folder of the processor, a request message from a second client computing device, the request message requesting the at least one attachment stored in the folder in the first client computing device;
   posting, at the sync post folder of the processor, a response to the request message received from the second client computing device, wherein the response includes the at least one attachment; and
   synchronizing the sync post folder of the processor with the sync post folder at the server, wherein synchronization includes posting the response to the request message received from the second client computing device.

8. The tangible computer readable storage medium of claim 7 wherein the predetermined off-loading policy is based on one or more of:
   a size of the at least one attachment;
   a predetermined amount of time; or
   an item property of any type.

* * * * *